United States Patent [19]

Lutz

[11] Patent Number: 5,762,410

[45] Date of Patent: *Jun. 9, 1998

[54] DOVETAIL JOINT CONSTRUCTION

[76] Inventor: Heinrich Lutz, 76 Gingerbread Castle Rd., Hamburg, N.J. 07419

[*] Notice: The term of this patent shall not extend beyond the expiration date of Pat. No. 5,720,537.

[21] Appl. No.: 856,478

[22] Filed: May 14, 1997

Related U.S. Application Data

[63] Continuation of Ser. No. 499,706, Jul. 7, 1995, Pat. No. 5,697,685.

[51] Int. Cl.⁶ .................................................. F16B 12/00
[52] U.S. Cl. .................. 312/111; 403/381; 248/223.41; 248/222.13
[58] Field of Search .................... 403/381, 331; 312/111; 108/56.1, 157.16, 158.12; 248/224.61, 224.41, 224.51, 222.13

[56] References Cited

U.S. PATENT DOCUMENTS

| | | |
|---|---|---|
| 142,890 | 9/1873 | Boda . |
| 692,506 | 2/1902 | Ecker . |
| 1,453,171 | 4/1923 | Oberwarth . |
| 1,986,465 | 1/1935 | Dempsey . |
| 2,036,348 | 4/1936 | Miller . |
| 2,774,609 | 12/1956 | Winger . |
| 3,078,888 | 2/1963 | Bruemmer . |
| 3,262,405 | 7/1966 | Sutton . |
| 4,091,746 | 5/1978 | Kimbrough . |
| 4,328,847 | 5/1982 | King, Sr. . |
| 4,564,732 | 1/1986 | Lancaster et al. . |
| 4,900,090 | 2/1990 | Davis . |

*Primary Examiner*—Peter M. Cuomo
*Assistant Examiner*—Gerald A. Anderson
*Attorney, Agent, or Firm*—William Squire

[57] ABSTRACT

One or a pair of aligned dovetail grooves secure various shelves to supports depending upon whether the shelf is an upper or lower unit. Vertical supports have male dovetail projections formed on each end for mating with a groove. A wedge projection is formed on the support end adjacent to the male dovetail projection for wedging against the shelf in interference fit when the male and female elements are assembled. Various embodiments for the wedge projection are disclosed. The supports have a width less than that of the shelves so that the dovetail joints are only visible from the shelving rear. The wedge projections are sufficiently small so as to not be observable from the shelving front. A particular shelf construction employs upper and lower shelves each comprising a dual construction of an upper and lower member. A triangular brace is secured to the lowermost shelf for support when the shelving is hung on a wall. All shelving members and supports are secured by identical dovetail joints and are collapsible since no dowels or adhesive is used to permanently secure the elements.

15 Claims, 4 Drawing Sheets

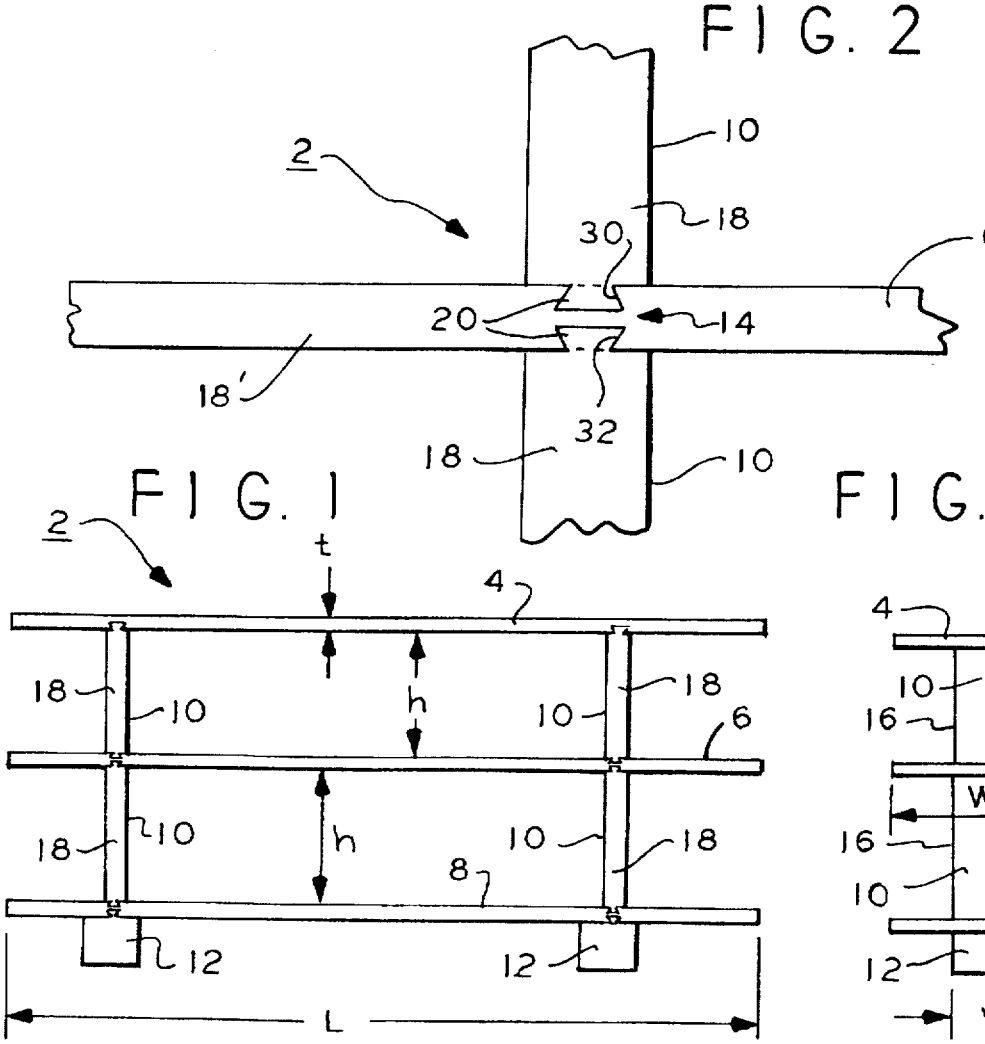
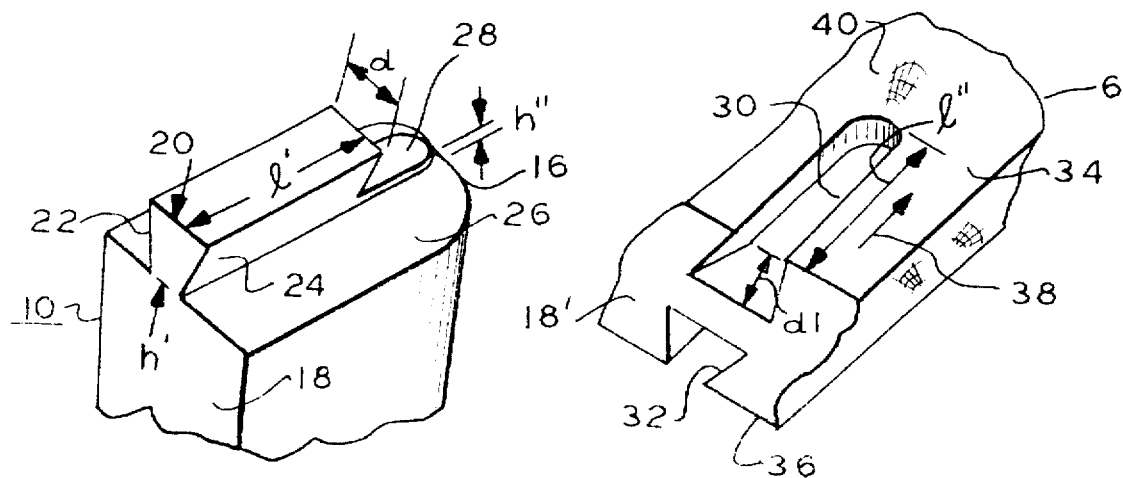

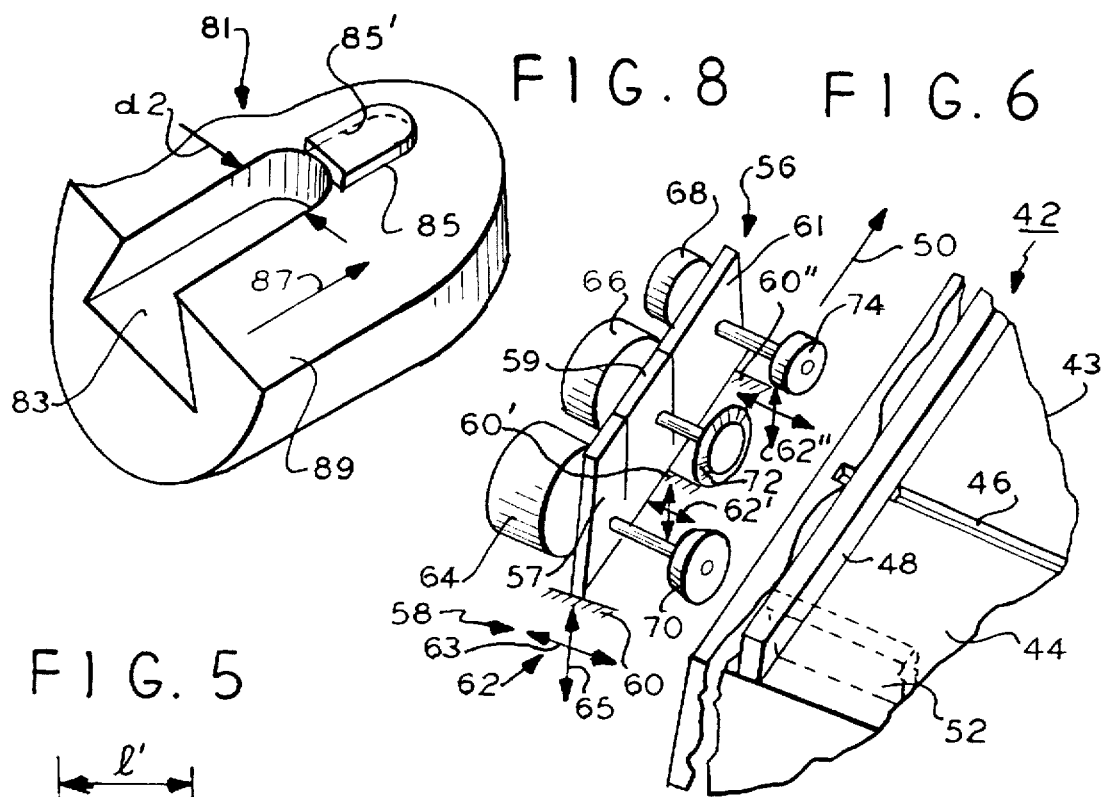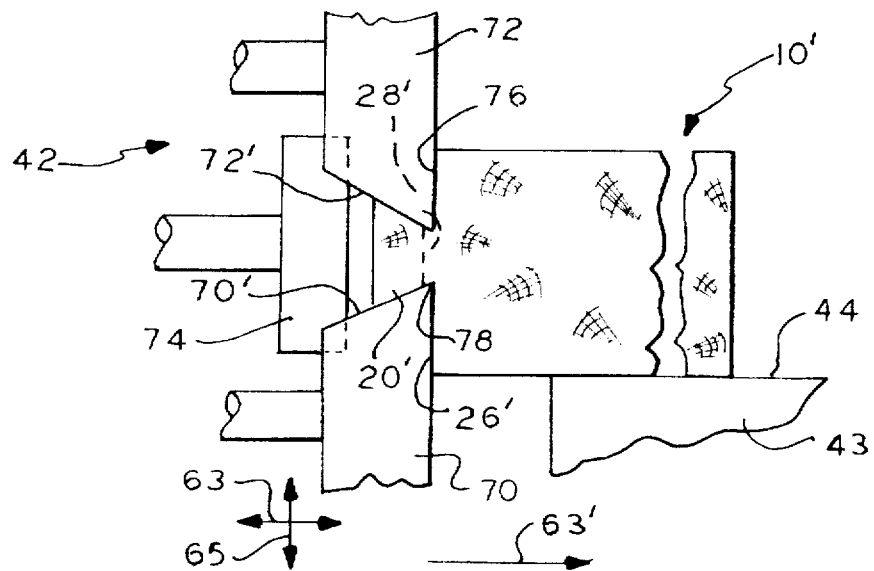

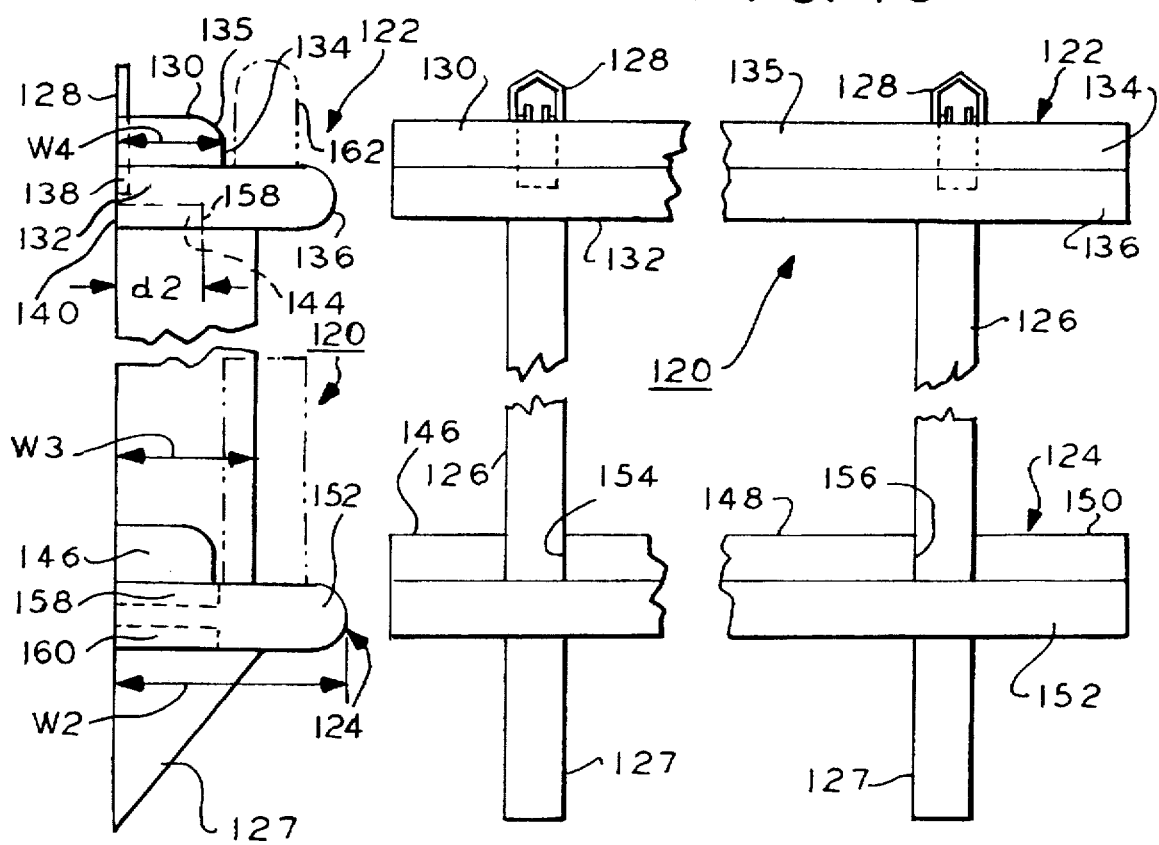

DOVETAIL JOINT CONSTRUCTION

This application is a continuation of application Ser. No. 08/499,706 filed Jul. 7, 1995, now U.S. Pat. No. 5,697,685.

BACKGROUND OF THE INVENTION

This invention relates to dovetail joints and structures, e.g., shelving or furniture, produced therewith.

Dovetail joints are widely used to interconnect wood structures in interlocking fashion, typically in shelving or furniture. For example, in U.S. Pat. No. 3,078,888, a dovetailing machine, shelving and fence structures employing dovetail joints are disclosed. A pair of spaced chippers are used to cut V-shaped grooves for a dovetail joint and are axially adjustable by adding or removing washers. A saw is used to trim the workpiece at the dovetail structure produced by the chippers.

U.S. Pat. No. 3,262,405 discloses an interlocking assemblage furniture using wedges with inclined walls to provide interlocking. Dovetail grooves and projections are also shown in U.S. Pat. Nos. 2,774,609; 4,091,746; 2,036,348; and 1,986,465 among others.

A problem recognized by the present inventor with prior art dovetail interlocking structures is that they tend to require further fasteners to provide a tight fitting locking arrangement. Typically, prior dovetails require adhesives or dowels to form a firm permanent connection. The reason for this is that the dovetail joints are usually made such that a clearance may be present between the projection and the groove. This clearance results from manufacturing tolerances and the random matching of male and female dovetail elements from a manufactured pool of elements. This clearance may permit the parts to undesirably separate.

This is discussed somewhat in U.S. Pat. No. 3,078,888 noted above in which differences in slant angle of the tenon occurred in the prior art to compensate for passes made with router bits in the direction of the wood grain at different cut angles to reduce chipping effects. This difference in angles caused loss in resistance to pull apart forces.

The prior art discussed above does not deal directly with providing tight fits of dovetail elements. In practice, in typical manufacturing operations, due to the random selection of the mating elements in a manufactured plurality of the dovetail male and female joint elements, the elements are insufficiently tight statistically to resist pull apart forces occurring during normal use of the structures. This is because the male and female joint elements are not made to correspond to one another on a selective one to one basis to insure the desired tightness of fit. Random tolerance variations in making such elements results in some differences in dimensions of the male and female dovetail elements such that loose joints invariably occur. To preclude such looseness, adhesives or dowels or other structures are added to tighten all such joints.

A further problem is the recognition of a need to provide dovetail joints which are not generally visible on the composite article in use so as to provide an aesthetically pleasing article. For example, in U.S. Pat. No. 4,091,746 this problem is addressed by hiding the dovetail joints, but using other tongue and groove arrangements to so hide the dovetail joints. The tongue and groove arrangements are visible externally the article. In the other patents noted above the dovetail joints are visible at either end of the joints.

SUMMARY OF THE INVENTION

A dovetail joint construction according to the present invention comprises a male member; a male dovetail projection upstanding from a surface of the male member; a female member having a dovetail groove in a surface thereof dimensioned for receiving the male dovetail projection to secure the male member to the female member forming a dovetail joint; and projection means coupled to one of the male and female members for wedging against the other of the male and female members in interference fit to fictionally secure the members together when joined.

In accordance with an embodiment of the present invention, an interlocking shelf structure comprises a plurality of shelves each having upper and lower opposing surfaces and front and rear edges spaced by a first width; and a plurality of shelf supports each having opposing ends and a second width, each support being connected to and between the shelves with a dovetail joint at each support end, the supports having a male dovetail projection at each end and the shelves having a female dovetail groove for receiving the male projection, the female dovetail grooves each extending from a shelf rear edge partially into the shelf a distance less than the first width so that the groove is not visible from the front edge.

In a further embodiment, the second width is less than the first width.

An interlocking shelf structure according to a further embodiment of the present invention comprises first and second shelves each comprising:

a) a first member having a thickness, a first width defining front and rear edges and a first length in a longitudinal direction; and b) at least one second member having a thickness, a second width smaller than the first; width, the second width defining front and rear edges and a second length in the longitudinal direction, the second member being secured to and overlying the first member such that the rear edges of the first and second members are coextensive and the front edge of the first member extends beyond the front edge of the at least one second member to form an article support region. The shelf structure further including a plurality of spaced interconnecting supports connected to the first member of each shelf with a dovetail joint and arranged such that each joint is visible only at the rear edges.

BRIEF DESCRIPTION OF THE DRAWINGS

FIG. 1 is a rear elevation view of a shelving arrangement utilizing the joint of FIG. 2;

FIG. 1a is a side elevation view of the shelving arrangement of FIG. 1;

FIG. 2 is a rear elevation view of a dovetail joint according to an embodiment of the present invention;

FIG. 3 is an isometric view of a male dovetail joint member of the embodiment of FIG. 1;

FIG. 4 is an isometric view of the female dovetail joint member of the embodiment of FIG. 1;

FIG. 5 is a side elevation view of the male member of FIG. 3;

FIG. 6 is an isometric diagrammatic view of a dovetail forming apparatus used to fabricate the dovetail member of FIG. 3;

FIG. 7 is an end elevation view of a portion of the apparatus of FIG. 6 illustrating the formation of the male dovetail joint member;

FIG. 8 is an isometric view of the female dovetail joint member in an alternative embodiment;

FIG. 12 is an end fragmented elevation view of a shelf arrangement according to a further embodiment of the present invention;

FIG. 13 is a front fragmented elevation view of the shelf arrangement according to the embodiment of FIG. 12; and FIG. 14 is a rear fragmented elevation view of the shelf arrangement according to the embodiment of FIG. 12.

DETAILED DESCRIPTION OF THE INVENTION

Figure 9:
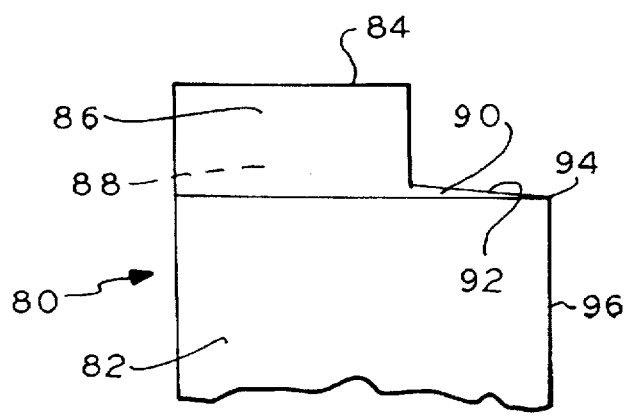
FIG. 9 is a side elevation view of a further embodiment of the male dovetail joint member.

In the Figures, like parts are designated with like reference numerals. In FIGS. 1 and 1a, shelving 2 comprises three shelves 4, 6 and 8 interconnected by a plurality of upright supports 10. A pair of support feet 12 are secured to the lowermost shelf 8. The shelves 4, 6 and 8, supports 10 and feet 12 are preferably formed of wood. The shelves 4, 6 and 8 have a width w. The supports 10 have a width w1 sufficiently less than width w so that the dovetail joints 14 are visible only from the rear edges 18 and 18' of the shelving 2.

The shelves have a thickness t and a length L. Preferably all of the thicknesses t are the same as are the lengths L for all of the shelves. The supports preferably have the same thickness t, width w1 and height h between the shelves 4, 6 and 6, 8. All of these relative dimensions are given by way of example and may differ in different embodiments.

In FIGS. 2, 3, 4 and 5, a representative dovetail joint 14 is illustrated. The male dovetail joint member comprises each support 10 or foot 12. The female member comprises each shelf 4, 6 and 8. In FIG. 3, a representative male dovetail member support 10 comprises a generally rectangular in transverse section wood support 10 having a front edge 16 with rounded corners, or circular segment as desired, and a planar rear edge 18. A dovetail projection 20 is formed integral with and one piece with the support 10. The projection 20 as typical for such projections has inclined side faces 22 and 24.

The inclination of the faces 22 and 24 with the plane of the end surface 26 of support 10 is the same and preferably is about 10° but may differ from this value according to a given implementation. The projection 20 may have a height dimension h' of about 0.375 inches and a maximum width dimension d of about ½ inch. The projection 20 has a length dimension l' of about 5.25 inches from the rear edge 18 of support 10, which is depends upon the width dimension w1 of the support 10. The support 10 has a width dimension w in the same direction of dimension l' of about 5.5 inches. Projection 20 is coplanar with that planar rear edge 18. The shelf 6 has a width w of about 7 inches.

A wedge projection 28 upstands from surface 26 at the end of projection 20. The thickness of projection 28 is exaggerated in the Figure. In practice, the projection 28 has a height h" above the surface 26 in the range of about 0.001 to 0.010 inches and preferably is about 0.001 to 0.003 inches. The height h" of the wedge projection is shown uniform but may be tapered as will be shown in other embodiments. The wedge projection 28 extends from the dovetail projection 20 to the front edge 16 of the support 10. However, the wedge projection may terminate medially the front edge 16 and the projection 20. All of the above dimensions are given by way of example and may differ according to a given implementation.

The female member shelf 6, for example, FIG. 4, has two grooves 30 and 32 aligned with each other and formed in opposite surfaces 34 and 36, respectively, of the shelf 6. The grooves 30 and 32 are identical and representative groove 30 will be described.

Groove 30 has a depth d1 which substantially is the same as height h' of the male projection 20, FIG. 3. The groove 30 has substantially the same dimensions and shape as the male dovetail projection 20, but slightly larger, e.g., 0.001 to 0.003 inches, to accommodate the projection 20 so as to permit the projection 20 to be assembled to the groove 30 by hand without excessive force. However, some interference fit is permitted to tightly secure the male projection 20 in the female groove 30. The groove 32 is formed of substantially the same dimensions as groove 30 as are all grooves in the various shelves and supports of shelving 2. Similarly, all male projections 20 of the various supports, feet and so on are substantially the same in dimensions as projection 20. This is important to provide interchangeability.

To assemble the male dovetail projection 20 to the female groove 30, the male projection 20 is translated in direction 38 until the rear edge 18 of the support 10 is coplanar with the rear edge 18' of the shelf 6. The length l" of the groove 30 is substantially the same as length l' of the projection 20 so that the projection 20 fully seats within the groove 30 until the rear edge 18' of shelf 6 and edge 18 of the support 10 are coplanar. The groove 30 length l" may be slightly larger than length l' for this purpose.

When fully inserted in the groove 30, the male support 10 projection 28 is compressed in interference fit with the surface 34 of the shelf 6. Wood being a compressible material compresses both at the wedge projection and on the surface 34 in region 40 (shaded). This interference fit of projection 28 to the surface 34 locks the support 10 to the shelf 6 thereby obviating the need for further fastening elements such as adhesive or dowels and so on to secure the supports to the shelves which might otherwise be needed if the fit is relatively loose. The wedge projection 28, however, because of its relatively small dimension h", is not visible in the assembled shelving 2.

The interference fit is such that manual assembly of the elements is readily possible without further tools. As a result, dimensional variations between the various male projections and female grooves that might occur during manufacturing is not a factor in providing interchangeability and a tight fit of the male projections of the supports and feet to the female grooves of the shelves.

The wedge projections 28 thus permit wide latitude of interchangeability of male and female elements without any need to match sizes of the mating male and female components. That is, there is no need to preselect particular male dovetail projections for mating with particular female dovetail grooves to provide a tight fit. The wedge projections insure such a tight fit regardless the fit of such male and female elements. Thus random selection of male and female dovetail elements maximizing interchangeability is possible without affecting the integrity of the desired tight fit.

As a further enhancement to providing uniform dimensional control of the male member dimensions given with respect to FIG. 3, and especially the distance between the inclined faces 22 and 24, which tends to vary considerably in prior art dovetail constructions, apparatus 42, FIG. 6 is provided. Apparatus 42 permits tighter control over dimensions of the male projection 22 to minimize loose fits by random selection of the mating elements without regard to their dimensional variations.

Apparatus 42 comprises a work table 43 having planar work surface 44, the surface 44 having a plurality of ways such as way 46 (only one being shown). A work piece guide fence 48 is secured to way 46 for guiding a workpiece for displacement in direction 50. Another fence 52, shown in phantom, is guided by a further way (not shown) which extends in directions of arrow 63 for guiding the movement of a workpiece in the directions of arrow 63. Other ways and fences may also be included as typical in wood working apparatuses.

Motor support 56 comprises three independently vertically and horizontally adjustable support sections 57, 59 and 61. The support 56 sections 57, 59 and 61 are secured for independent adjustment by adjustment mechanism 58. The mechanism 58 is diagrammatically shown in the figure. The mechanism 58 comprises three independently operated adjustment mechanisms represented by symbols 60, 60' and 60" and arrows 62, 62' and 62", each symbol and arrow combination corresponding to a different respective section 57, 59 and 61. The support 56 sections 57, 59 and 61 and the corresponding motors 64, 66 and 68 thus are each independently adjustably movable in horizontal directions represented by arrow 63 and vertical directions represented by arrow 65 in the set of arrows 62, 62' and 62". In the alternative, only the motors 66 and 68 may be adjusted vertically, with the table surface 44 also being adjustable vertically by structure (not shown) to adjust the surface 44 spacing to the cutter 70 of motor 64.

Router cutters 70, 72 and 74 are respectively driven by motors 64, 66 and 68. The sections 57, 59 and 61, for example, may be secured for horizontal and vertical displacement via suitable guides and motors (not shown) or manual screw feed devices (not shown) typical in lathe, milling machines and similar apparatuses. The motors 64, 66 and 68 are thus independently adjustable in both the axial directions arrow 63 and vertical directions arrow 65 respectively parallel and normal to the work surface 44 of table 43.

In FIG. 7, representative shelving support 10' is shown with a male dovetail projection 20' and wedge projection 28' being fabricated by apparatus 42. Each cutter 70, 72 and 74 is set to an adjustable spaced relative relationship in the vertical and horizontal directions 65 and 63, respectively for the fabrication of a male dovetail projection on a male dovetail member such as support 10'. The female member dovetail groove is fabricated by a suitably shaped router cutter bit (not shown). The female groove is fabricated in a single pass of the mating router bit (not shown) in a known manner.

The spacing of the cutter 72 to the cutter 70 is set to fabricate the corresponding V-shaped grooves 76 and 78 in support 10'. The support 10' length dimension extends in the directions of arrow 63 and is guided by appropriate fences not shown in FIG. 7. The spacing d (FIG. 3) of the dovetail projection 20' is thus determined by the spacing of cutters 70 and 72. This spacing can be precisely set to uniformly fabricate all dovetail projections 20 of all the workpieces such as supports 20, 20'. As the cutters wear or as slight dimensional variations occur in the spacing of the surfaces of the workpieces abutting the guide fences which spacing variations which might affect dimension d, the spacing of the cutters 70 and 72 can be reset accordingly. This adjustment can be used to hold the dimension d to tight tolerances not otherwise possible with fixed cutter spacings or in apparatuses using a single cutter for cutting both V-shaped grooves of the male dovetail projection as in the prior art processes. By holding dimension d to tight tolerances, a good tight friction fit can be provided the male and female dovetail elements. This assures that random selection of the male and female elements does not result in randomly occurring loose fitting tolerances as occurs in the prior art.

The cutter 74 is positioned in the designated vertical position of arrow 65 for fabricating the wedge projection 28'. The cutter 74 is advanced in direction 63' to produce the projection 28'. The height h" (FIG. 5) of the projection 28' above the surface 26' of the V-shaped groove 78 is thus controllable to tight tolerances. This control produces the preferred projection height h" of 0.001–0.003 inches. The adjustability of the cutters 70, 72 and 74 positions provides wide latitude in control of the tolerances of the resulting male dovetail projection 20, 20'.

The cutters 70 and 72 have planar cutting surfaces 70' and 72' which lie in corresponding planes. These planes are inclined relative to the cutter side surfaces the desired angles to form the grooves 76 and 78. The wedge projection 28' is aligned in the space between these two planes as best seen in FIG. 3. That is, the wedge projection 28, FIG. 3, is initially formed in the rough by the cutters 70 and 72, FIG. 7, and is coextensive with the male dovetail projection 20. The cutter 74 then reduces the height of the wedge projection accordingly as described above.

While the angle of inclination of the grooves 76 and 78 is as given above herein, this angle may differ according to a given implementation, as may all other dimensions of the male and female dovetail elements.

In FIG. 8, an alternative embodiment includes a female dovetail member 81 having a female dovetail groove 83. A wedge projection 85 projects upstanding from surface 87 of member 81. The projection is aligned in direction 87 with groove 83 and has the same transverse dimension d2 as groove 83 at surface 89. The projection 85 may also be tapered as shown by the broken line 85' so that the projection 85 at groove 83 merges with surface 89. The projection 85 wedges against a surface corresponding to surface 26, FIG. 3 in the region aligned with the male projection 20 in the length direction (projection 28 being omitted in this embodiment).

In FIG. 9, a further alternate embodiment of a male dovetail member 80 comprises a main section 82 and a dovetail projection 84 formed from an end of section 82 having inclined side faces 86 and 88. A wedge projection 90 is formed in the space aligned with the projection 84 as described above for projection 20. However, the projection 90 has a tapered surface 92. The taper of surface 92 facilitates the wedging action against the mating female member, FIG. 4 as compared to the squared edge of the projection 28 at edge 16, FIG. 3.

In FIG. 9, the wedge projection 90 has a negligible edge 94 at section 82 edge 96. The taper of projection 90 is obtained by providing the router cutter forming this projection with an appropriate taper at the cutting surface.

Figure 10:
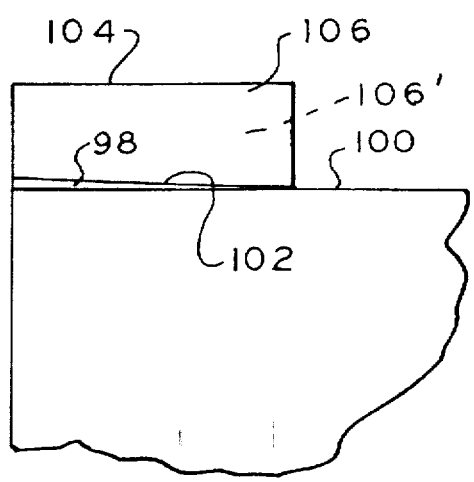
FIG. 10 is a side elevation view of a further embodiment of the male dovetail joint member.

FIG. 10 shows an alternative embodiment in which at least one wedge projection 98 is provided the surface 100 of V-shaped groove 102 of dovetail projection 104. Projection 98 may be a separate wedge member bonded to surface 100 in each V-shaped groove of the dovetail projection 104 or to only one side of the dovetail projection 104 in one V-shaped groove. Similarly the wedge shaped projection 98 may be bonded to the other surface of the V-shaped groove on one or both inclined side faces 106, 106' of the dovetail projection 104.

Figure 11:
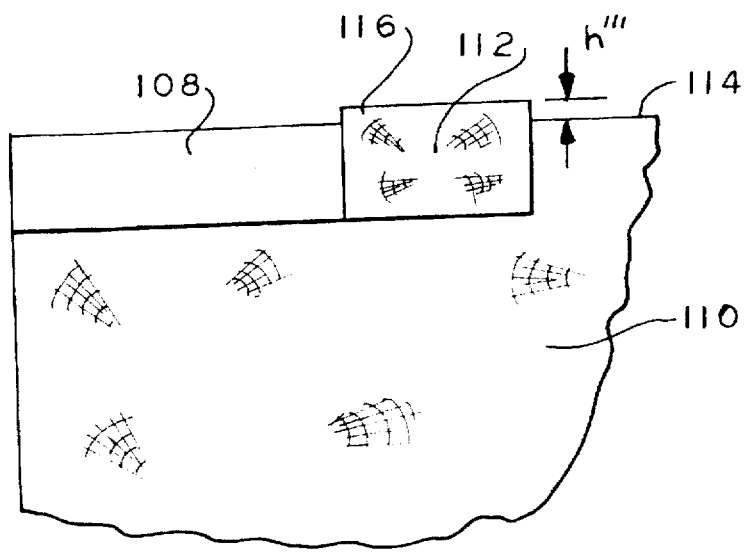
FIG. 11 is a side elevation sectional view of a further embodiment, of the female dovetail joint member.

In FIG. 11, a further embodiment comprises a female dovetail groove 108 formed in workpiece 110. A projection member 112 is bonded in the groove 108 and projects above the surface 114 of the workpiece 110 a distance h'". The projection member 112 portion in the region of distance h'" is used to wedge against the surface of the male dovetail member, such as surface 26, FIG. 3, in the region between the planes forming the inclined side faces of the male dovetail member (the projection 28, FIG. 3, not being present in this embodiment). The projection member 112 end surface 116 may also be tapered in a further embodiment.

In FIGS. 12–14 a further embodiment of a shelf construction 120 employs the dovetail construction of FIGS. 2–5. The shelf construction 120 comprises a top shelf 122, preferably wood, and one or more lower shelves 124, preferably wood, interconnected by identical vertical supports 126, preferably wood. A pair of braces 127, preferably wood, depend from the lowermost of members 124. A pair of metal commercially available hangers 128 are secured to the rear surface 130 of the top shelf member 122.

The top shelf 122 comprises a pair of elongated members 130 and 132. Members 130 and 132 are preferably the same thickness (top to bottom of the figure) and of the same length (left to right in the figure). The front edge 134 of member 130 has a circular radius 135 at its upper corner. The member 130 is otherwise rectangular in section. The front edge 136 of member 132 is a circular segment. The member 130 has a width w4 which is preferably about one half the width of the member 132. The rear edges 138 and 140 of the members 130 and 132, respectively are coplanar. The upper member 130 is fastened to the lower member by nails (not shown) or by bonding and so on.

The lower member 132 of shelf 122 has a pair of like spaced female trapezoidal shaped dovetail grooves 144, FIG. 14. The grooves 144 extend into member 132 a distance d2, FIG. 12, which is less than the width w4. The grooves 144 are not visible from the front edge 134 of member 132. The grooves 144 are formed as shown in more detail in FIGS. 2 and 4 with respect to groove 30 having a circular interior end.

Shelf 124 includes a plurality of upper members 146, 148 and 150 of identical transverse cross section as member 134. The members 146, 148 and 150 are secured to lower member 152 in spaced relation to form slots 154 and 156 therebetween. Except for the lengths, the members 146, 148 and 150 are otherwise identical to member 134.

Lower member 152 is identical to lower member 136 except that member 152 has a pair of vertically aligned like dovetail grooves 144. The grooves 144 in member 152 are vertically aligned with slots 154 and 156.

Interconnecting supports 126 are preferably the same thickness as the members of the shelves 122 and 124 and are closely received in slots 154 and 156. The supports 126 have a width w3 greater than the width w4 of the upper members 134 of upper shelf 122 and lower shelf 124 members 146, 148 and 150 and less than the width w2 of lower members 136 and 152.

The ends of each support 126 each have a male dovetail projection 158 and wedge projection (not shown in FIGS. 12–14) the same in construction as projection 20 and wedge projection 28 as shown and described in connection with the support 10, FIG. 3. The dovetail grooves 144 of member 152 appear as illustrated for shelf 6, FIG. 4. Because the wedge projection 28, FIG. 3 is of shallow height h" it is not visible from the front of the shelves 122 and 124, FIG. 13. In FIG. 14, the dovetail joints are visible from the rear but this is not important as the shelf construction 120 is hung on a wall via hangers 128 with the joints abutting the wall and thus not visible from the front.

Braces 127 are identical and each are triangular as shown in FIG. 12. The braces 127 are of the same thickness as the supports 126 and include male dovetail projections 160, the projections 160 mate with grooves 144 in the lower surface of the lowermost shelf 124.

Should more than two shelves 122 and 124 be employed, then multiple shelves identical to shelf 124 are included. Supports such as supports 126 interconnect the intermediate shelves. The shelf construction 120 has a pleasing appearance and a finished look. Yet the entire structure can be easily assembled by an unskilled person. The wedging action of the wedge projections tightly secure the various shelf elements together in permanent-like fashion without a need to prematch male and female elements of the dovetail joints. An article 162 shown in phantom is supported by the shelf 122, FIG. 12.

It will occur to one of ordinary skill that modifications may be made to the disclosed embodiments such as creating a wide variety of lattice, furniture and shelving arrangements as well as employing modifications to the dovetail joints disclosed herein. It is intended that the scope of the invention is as defined in the appended claims.

What is claimed is:

1. A dovetail joint construction comprising:

a male member;

a male dovetail projection upstanding from a first planar surface of the male member;

a female member having a dovetail groove in a second planar surface of the female member dimensioned for receiving and engaged with the male dovetail projection to secure the male member to the female member forming a dovetail joint; and a wedge projection coupled to one of said male and female member respective planar surfaces for wedging against the other of said male and female member planar surfaces in interference fit in a region between said surfaces to frictionally secure the members together joined by said groove and said male dovetail projection.

2. The construction of claim 1 wherein said wedge projection upstands from one of said surfaces a distance sufficiently small so as to form a negligible gas between said surfaces that is substantially invisible externally said members and a distance sufficiently great to form a wedging action.

3. The construction of claim 1 wherein said male dovetail projection extends in a given direction on said male member surface, said wedge projection upstanding from the male member surface aligned with the male dovetail projection in said given direction.

4. The construction of claim 3 wherein said male dovetail projection upstands from the male member surface and tapers on opposing side faces from a first width transverse the given direction at the junction with said male member surface to a relatively wider transverse width distal said junction, said wedge projection having a width transverse the given direction approximately the same as said first width.

5. The construction of claim 3 wherein said wedge projection and said dovetail projection each have corresponding coextensive side faces extending in the same given direction, said wedge projection upstanding from said male member surface aligned in a given direction with said dovetail projection.

6. The construction of claim 5 wherein the male projection upstands from the surface of the male member in the range of less than 0.010 inches.

7. The construction of claim 1 wherein the male dovetail projection and the wedge projection each have coextensive first and second side faces, the first and second side faces being inclined in diverging relation to each other and relative to said male member surface.

8. The construction of claim 1 wherein said male and female member surfaces each have a respective edge adjacent said dovetail projection and groove, said wedge projection upstanding from said male surface a distance sufficiently small so as to form a negligible gap between said surfaces that is substantially externally invisible at said edges and a distance sufficiently great to form a wedging action with said female member.

9. The construction of claim 1 wherein the male member has first and second opposing edges, said male dovetail projection having a third edge coextensive with and extending in a given direction from said first edge, said wedge projection being contiguous with said male dovetail projection and extending to said second edge aligned with the male dovetail projection.

10. A dovetail joint construction comprising a female member having a dovetail groove in a planar surface of the female member for receiving a dovetail member, said dovetail member comprising;

a male member;

a male dovetail projection upstanding from a planar surface of the male member for insertion into the female member dovetail groove to secure the male member to the female member forming a dovetail joint therewith with said planar surfaces in abutting relation; and a wedge projection upstanding from said male member planar surface externally of and adjacent to said male projection for wedging against the female member planar surface in interference fit to frictionally secure the members together joined by said groove and dovetail projection.

11. The construction of claim 10 wherein the wedge projection and male member are integral one piece construction.

12. A dovetail joint construction including a male dovetail projection upstanding from a first planar surface of a male member for insertion into a female dovetail groove to secure the male member to the female groove forming a dovetail joint therewith, a female dovetail element comprising:

a female member having a dovetail groove in a second planar surface of the female member for receiving the male dovetail projection; and a wedge projection upstanding from the female member second planar surface for wedging against the male member first planar surface in interference fit to frictionally secure the members together when joined by said male dovetail projection and female dovetail groove.

13. The joint construction of claim 12 wherein the wedge projection and female groove extend in a given direction and the wedge projection is aligned with said female groove and projects above the surface of the female member an amount sufficiently small to form a negligible gap between said first and second surfaces when joined.

14. A male dovetail joint member mating with a dovetail groove formed in a first planar surface of a female member, said male member comprising:

a first member having a planar second surface;

a first projection for mating with the dovetail groove and extending in a given direction parallel to said second surface and being trapezoidal in section transverse the given direction, said first projection upstanding from said second surface and having opposing planar side faces each defining a plane intersecting the second surface at an angle less than 90° in mirror image relation such that the trapezoidal projection is narrowest at a region where it connects to the first member at said planar second surface and said side faces overhang said planar second surface, said side faces each extending in said given direction; and a wedge projection upstanding from said planar second surface in a region intermediate said planar first and second surfaces and external to said first projection, said wedge projection having a height above said planar second surface to wedge against the first surface in interference fit therewith.

15. The construction of claim 14 wherein the members and projections are wood and the wedge projection provides an interference fit in the range of less than 0.010 inches.

* * * * *